Sept. 14, 1954 J. F. KENDRICK 2,688,979
ABRASION RESISTANT CHECK VALVE
Filed Aug. 31, 1951 3 Sheets-Sheet 1
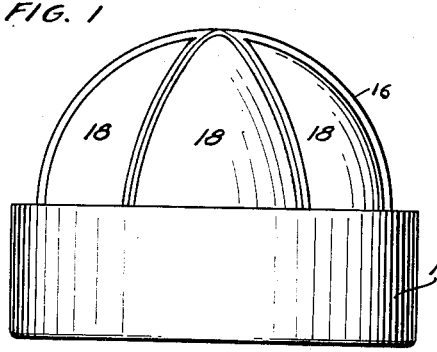
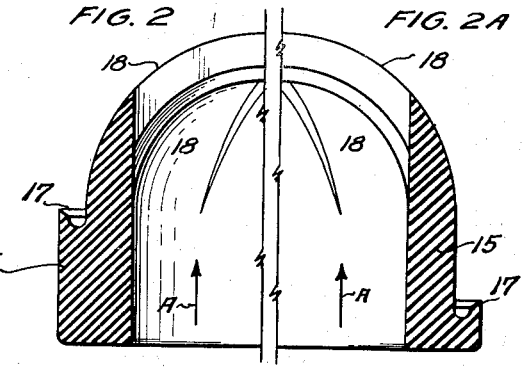
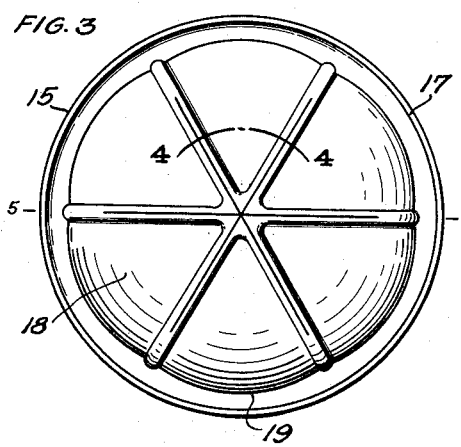
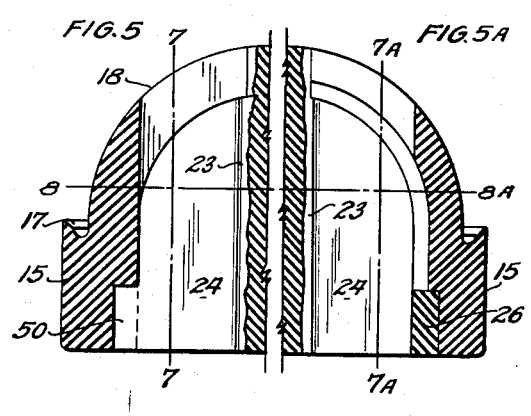
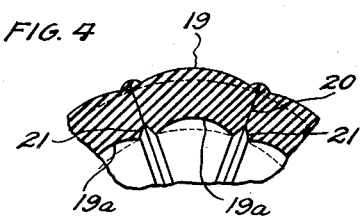
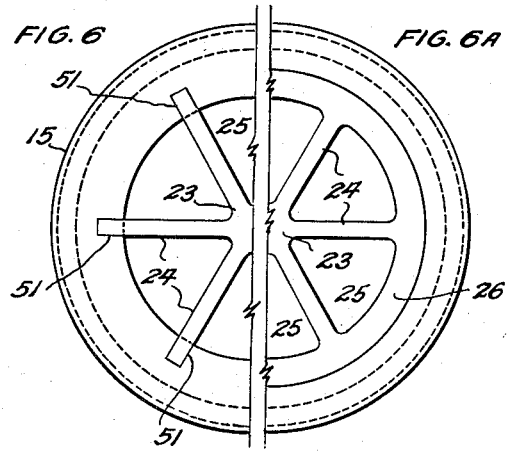
INVENTOR.
John F. Kendrick
BY
*W. S. McDowell*
ATTORNEY

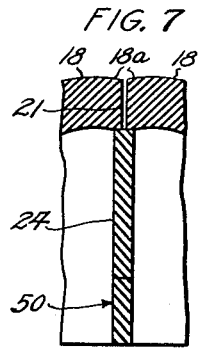
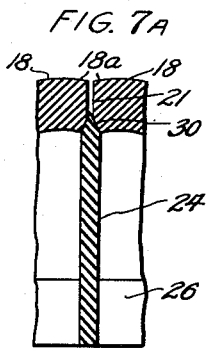
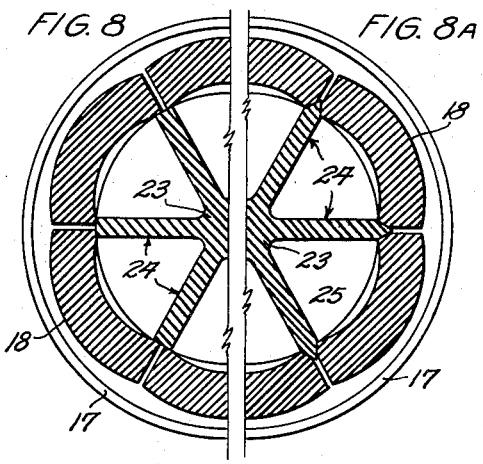
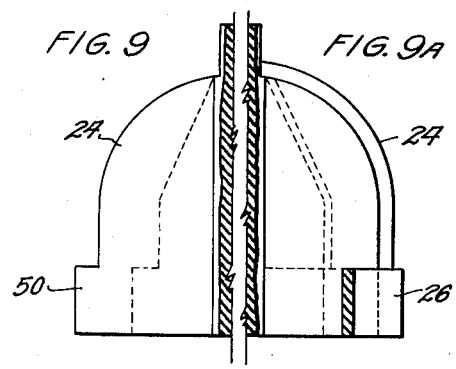
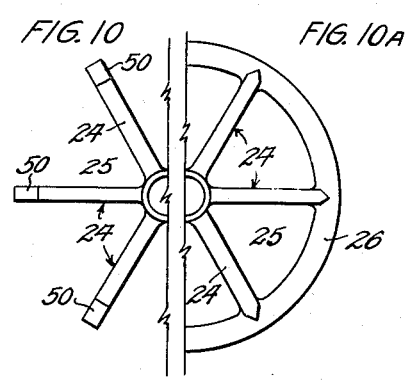
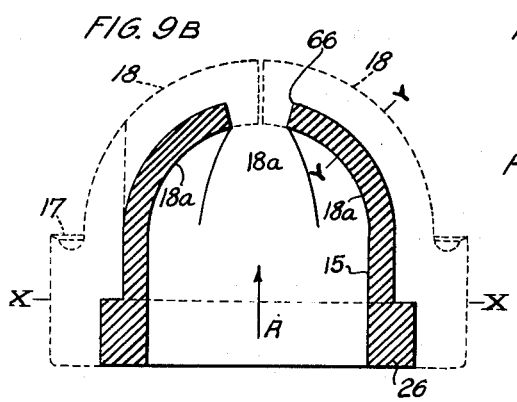
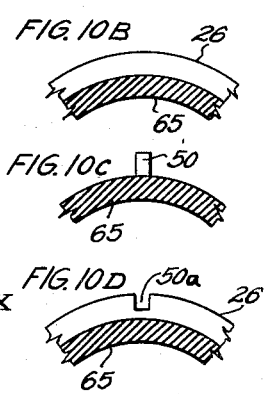
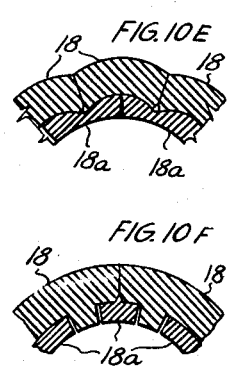

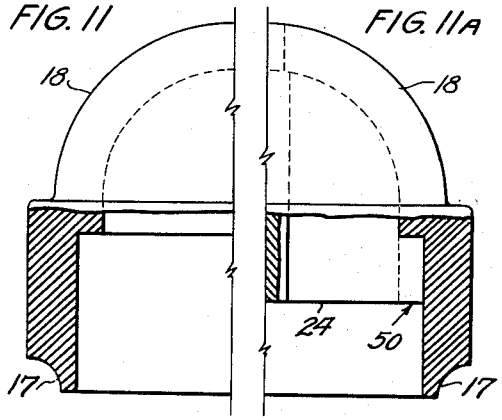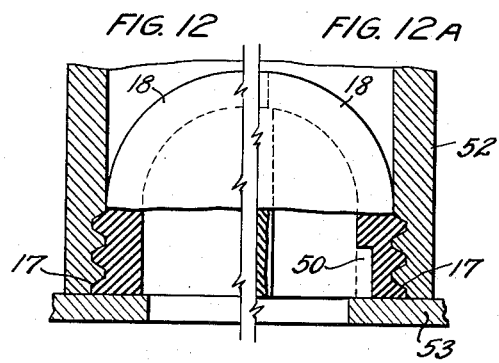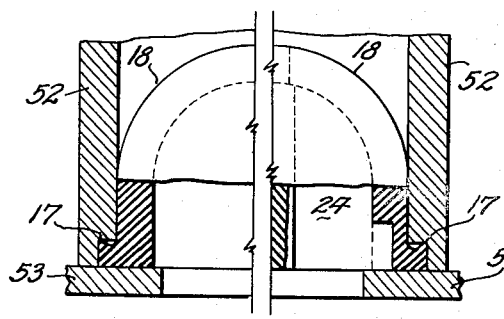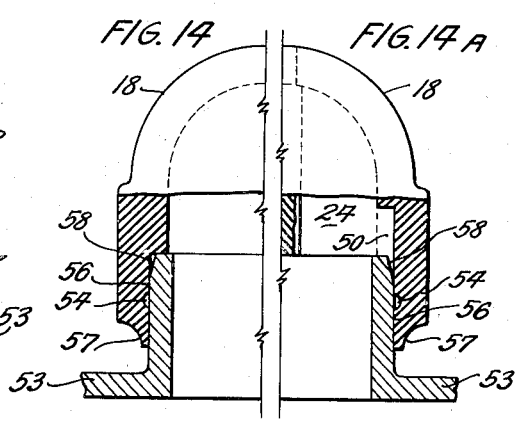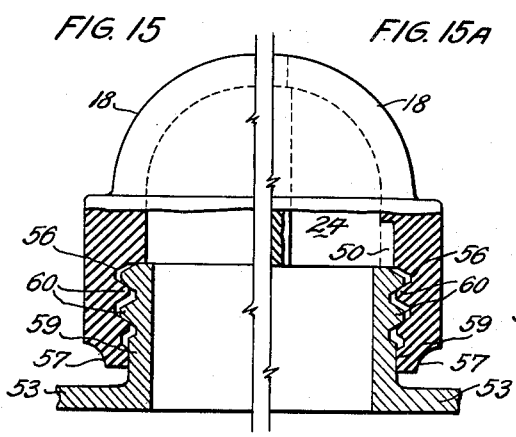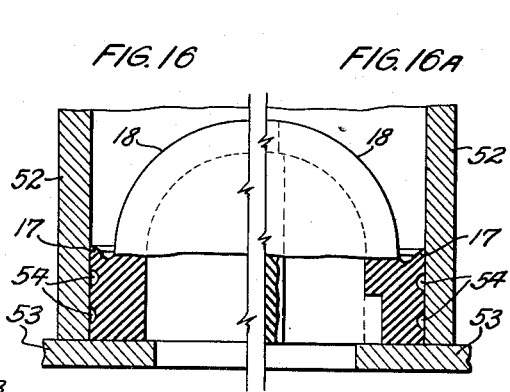

Patented Sept. 14, 1954

2,688,979

UNITED STATES PATENT OFFICE 2,688,979

ABRASION RESISTANT CHECK VALVE

John F. Kendrick, Columbus, Ohio

Application August 31, 1951, Serial No. 244,643

6 Claims. (Cl. 137—512.15)

This is a continuation-in-part application, replacing Serial No. 141,048, filed January 28, 1950, and now abandoned, for Abrasion Resistant Check Valve.

This invention relates to apparatus of the check-valve type, for controlling the flow of fluids in conduits or other confining members, and has particular reference to apparatus having abrasion-resisting properties by which fluids containing suspended or entrained solids are so handled as to avoid injury to or undue wear on the part of the confining and controlling members through which the fluid passes. More particularly, it has to do with a check-valve comprising a cylindrical body, with a segmented hemispherical closure, integral with one end of the body, made from an elastic, abrasion resistant material, Considerable difficulty exists at present in providing simple and efficient wear-resisting apparatus for confining and controlling the flow of various fluids containing suspended solids, particularly solids of an abrasive or gritty nature, such as are encountered in hydraulic dredging, sewage disposal and flotation systems. Among these difficulties, there is the problem of rapid wear of the fluid-confining equipment as the result of abrasion. In a valve, for instance, it is not sufficient to form the principal parts thereof from abrasion-resisting materials, such as rubber and the like, or to line the main body of the valve with such a material. If it is desired to avoid as much trouble as possible from the handling of such fluids, it is necessary that no unprotected parts be present, such as valve pivots, or other similar parts exposed to the action of the abrasive fluid.

Again, the valve should be designed for the purpose of permitting as nearly as possible straight line flow of the fluid. Abrupt changes in the direction of flow through a valve or pipe fitting introduces impact forces, which merely increase the destructiveness of the abrasive action of the suspended solids. Abrupt changes in the direction of flow also increase the pressure drop through the fitting or other flow channel. Wear from abrasive action is also a function of flow velocity, and therefore it is advantageous to use over-size fittings to reduce the velocity without increasing materially the first cost of the equipment.

Further, there is the problem of the particles of the fluid suspended solids lodging on the seat of a valve in such a manner that it will not close tightly. There is also the danger of particles of abrasive matter getting into the working parts of a valve to such an extent that it is often difficult or impossible to operate it easily, with the result that the working parts of the valve are either broken or wear rapidly. In certain instances, it is necessary to install a fitting at the bottom of a long vertical pipe or riser and when the flow is stopped, and percentage of abrasive suspensions contained in the fluids may be such as to completely fill the fitting upon settling. Water laid sand, for instance, is incompressible, and under such extreme conditions may easily render a valve inoperative. When the closure is effected by abutting, resilient segments, the initial flow will follow paths of least resistance, and will frequently be sufficient to float the settlings and flush the check-valve Finally, the use of abrasive resistant materials ordinarily only delays the time of failure, since all such materials wear slowly. Also, many of them are injured by heat, hydrocarbons and various chemicals. Therefore, it is desirable to use an inexpensive construction and one that can be repaired or replaced readily and cheaply.

Therefore, it is an object of this invention to provide improved apparatus for handling moving fluids, particularly those containing suspended solids, and wherein the apparatus involves an improved valve in which all parts thereof may be composed of wear-resisting material.

It is another object of this invention to provide valve-forming elements so constructed and situated as to lend themselves to straight line fluid flow, whereby to eliminate or minimize impact and pressure drop.

It is, also, another object of this invention to provide a valve for the purposes set forth having a large free flow area for the passage of fluid therethrough.

It is still another object of this invention to provide a valve in which both the movable valve elements and the seat or seats therefor are sufficiently resilient to reduce or resist destruction when subjected to the presence of abrasive solids and eliminate the annoyance of valve chatter, such as that produced by the vibration of intermittently contracting metallic parts.

It is a further object of this invention to provide a valve in which the contacting surfaces of the movable valve elements and the seat or seats therefor are sufficiently resilient to enable them to surround small solid particles caught between them, and thereby effectively seal the valve against the operating pressure to greatly reduce or prevent leakage. In connection with this object, the design of the valve is such that when solid particles are embedded between the movable elements and their seats, the surface formation will be such as to permit such particles to be flushed from the surfaces when fluid flow is resumed through the valve.

A further object of the invention is to provide an abrasion resisting valve composed of rubber, or rubber-like materials adapted to be stationarily positioned in a conduit, or other confining structure, through which fluids are caused to flow, said valve embodying a cylindrical base having integrally formed therewith a plurality of resilient, relatively separable, dome-forming segments, the latter being formed to flex outwardly and separate when fluid pressures are applied to the under surfaces thereof, and, conversely, by reason of their resiliency and normal dome-shaped configuration, to close in relative fluid-sealing engagement, precluding the passage of fluid therebetween, when fluid pressures are applied to their outer surfaces.

Still another object of the invention is to be found in the provision of a valve of the so-called "orange peel" type and embodying a base ring of rubber or of rubber-like material having integrally formed therewith a plurality of resilient, relatively separable and normally arcuately curved segments, which respond to the pressure of fluid flowing in one direction through the valve to flex and separate to admit of fluid flow and close and seal when the fluid flow is in the opposite direction, and to mount within such a valve an interfitting, closely related alignment body or spider composed of a multiplicity of radially disposed partitions which mate with the resilient segments of the main valve body contiguous to their relatively adjacent edges, whereby to limit inward flexure of the valve body segments to seal the valve against fluid flow when flow forces to be checked are applied thereto. An alternate design comprises an alignment body concentrically disposed inside the main valve structure, constructed similarly to the main valve body, with a ring-like base having integrally joined therewith a plurality of resiliently flexible, relatively separable arcuate segments. In assembly, this alignment body is rotated about the common axis, so that its arcuate segments overlap the abutting contact edges of the corresponding adjacent arcuate segments to bring them into alignment for abutting contact, when the segments are compressed by an externally applied pressure. Such a body conforms with the normal internal curvature of the valve proper, has an unobstructed fluid flow passage therethrough and lends itself to mechanical opening by the insertion of a pipe through the ring-like base. Another object of this invention is to insure the structural stability of the segmented hemispheric valve, when subjected to the maximum pressures permitted by the material from which it is made.

Finally, it is an object of this invention to disclose the more important ways this elemental check valve may be installed in housings, conduits and other confining members.

For a further understanding of the nature of the invention and the detailed features of construction thereof, as well as additional objects and advantages, reference is to be had to the following description and the accompanying drawings, wherein:

Fig. 1 is a side elevational view of a valve formed in accordance with the present invention;

Fig. 2 is a fragmentary vertical sectional view taken therethrough, showing a fluid pressure actuated sealing lip formed in the outer surface of the cylindrical body, contiguous to the valve segments;

Fig. 2A is a fragmentary vertical sectional view taken therethrough, showing a fluid pressure actuated sealing lip formed in the outer surface of the cylindrical body, positioned near its outer end;

Fig. 3 is a top plan view;

Fig. 4 is a fragmentary transverse vertical sectional view on the plane indicated by the line 4—4 of Fig. 3;

Fig. 5 is a fragmentary transverse vertical sectional view at 5—5 of Fig. 3, showing one form of the complementary edges of the alignment spider;

Fig. 5A is a fragmentary transverse vertical sectional view at 5—5 of Fig. 3, showing another form of the complementary edges of the alignment spider;

Fig. 6 is a fragmentary bottom plan view of the structure disclosed in Fig. 5;

Fig. 6A is a fragmentary bottom plan view of the structure disclosed in Fig. 5A;

Fig. 7 is a fragmentary vertical transverse sectional view on the line 7—7 of Fig. 5;

Fig. 7A is a fragmentary vertical transverse sectional view on the line 7A—7A of Fig. 5A;

Fig. 8 is a fragmentary horizontal sectional view on the line 8—8 of Fig. 5;

Fig. 8A is a fragmentary horizontal sectional view on the line 8A—8A of Fig. 5A;

Fig. 9 is a fragmentary side elevational view partly sectional of the radial partitions of one form of alignment spider;

Fig. 9A is a fragmentary side elevational view partly sectional of the radial partitions of another form of alignment spider;

Fig. 9B is a side elevational sectional view, on line 5—5 of Fig. 3 of an alternate alignment body, with the main valve body shown in broken lines;

Fig. 10 is a top plan view of the alignment spider of Fig. 9;

Fig. 10A is a top plan view of the alignment spider of Fig. 9A;

Fig. 10B is a fragmentary plan view partly sectional on line x—x of Fig. 9B, showing a radial extension of the base ring of the alignment body as one construction for holding the alignment body operably positioned with respect to the valve;

Fig. 10C is a fragmentary plan view partly sectional on line x—x of Fig. 9B, showing an alternate construction for holding the alignment body operably positioned with respect to the valve;

Fig. 10D is a fragmentary plan view partly sectional on line x—x of Fig. 9B showing still another construction for holding the alignment body operably positioned with respect to the valve;

Fig. 10E is a fragmentary sectional view on line y—y of Fig. 9B showing one possible sectional configuration of the arcuate segments of the alignment body;

Fig. 10F is a fragmentary sectional view on line y—y of Fig. 9B showing another possible sectional configuration of the arcuate segments of the alignment body;

Fig. 11 is a fragmentary vertical sectional view of the elemental valve with the outer portion of the ring-like body extended as a skirt for installation on a nipple;

Fig. 11A is a fragmentary vertical sectional view of the elemental valve with the alignment spider in place with the outer portion of the ring-like body extended as a skirt for installation on a nipple;

Fig. 12 is a fragmentary vertical sectional view of the elemental valve installed in an internally threaded socket;

Fig. 12A is a fragmentary vertical sectional view of the elemental valve with alignment spider installed in an internally threaded socket;

Fig. 13 is a fragmentary vertical sectional view of the elemental valve installed in a socket, with vacuum and sealing lip anchoring;

Fig. 13A is a fragmentary vertical sectional view of the elemental valve installed in a socket, with alignment spider, with vacuum and sealing lip anchoring;

Fig. 14 is a fragmentary vertical sectional view of the elemental valve installed on a nipple, with another form of sealing lip, and vacuum anchoring;

Fig. 14A is a fragmentary vertical sectional view of the elemental valve installed on a nipple, with alignment spider in place, with vacuum anchoring;

Fig. 15 is a fragmentary vertical sectional view of the elemental valve installed on an externally threaded nipple;

Fig. 15A is a fragmentary vertical sectional view of the elemental valve with alignment spider in place, installed on an externally threaded nipple;

Fig. 16 is the valve of Fig. 2, mounted in a socket and modified for vacuum anchoring;

Fig. 16A is the valve of Fig. 16, with alignment spider in place.

In the drawings, Figs. 2, 2A, 5, 5A, 6 and 6A and 8 and 8A to 15 and 15A are symmetrical about the vertical axis. Referring to the form of my invention illustrated in Figs. 1 to 4, inclusive, the numeral 16 designates a simple "orange peel" valve consisting of a hollow cylindrical base ring 15. Integrally formed with this ring is an approximately hemispherical segmented dome 16. The outer cylindrical wall surfaces of the ring 15 are designed to contact the inner cylindrical wall surfaces of a valve housing not shown. An annular fluid pressure sealing lip 17 may be integrally formed with the ring 15 in instances where the use of such a lip is needed, as when maximum allowable pressures are encountered. On low pressures, the cylindrical body will operate like a cork, and a sealing lip will not be necessary in many instances. Such a fluid pressure actuated sealing lip permits the valve to contract and expand radially and longitudinally without imposing objectionable distortional stresses. Therefore, the elemental valve with sealing lip is a practical subcombination. The inner cylindrical portion of the ring is adapted for the passing of a fluid, flow taking place in the direction indicated by the arrow A (Fig. 2) when the segments of the dome-like valve are separated by fluid pressure, and the valve is open.

The hemispherical dome of the valve is divided into a plurality of resilient, relatively separable arcuate segments, shown at 18, which, when extended or flattened, are approximately triangular in shape. Any suitable number of these segments may be utilized, preferably from six to ten. These segments may be formed by suitable provisions in their manufacturing mold, or they may be joined in the original piece and cut into segments with a secondary operation.

When fluid flow occurs through the valve in the direction indicated by the arrow A (Fig. 2) the segments are forced outward from the center, and when so forced outwardly, the segments assume positions in substantial alignment with the base ring 15. When such flow is stopped, the natural elasticity of the material from which the valve is made returns the segments to their hemispherical dome-forming positions. As fluid pressure on the inside of the valve is further reduced, a reverse or downwardly directed pressure on the outside of the valve forces the segments together into tight fluid-sealing and pressure-resisting engagement with each other. By being formed from an elastic or resilient material, the outer edges of the segments will close around any solid matter caught between them with sufficient contact surface and pressure to provide an effective seal against serious leakage, but when flow is again resumed in the direction indicated by the arrow A, the solid matter so confined will be washed off the edges and surfaces of the segments and carried along with the fluid in a discharging direction.

A hollow hemisphere joined to a hollow cylinder is structurally resistant to a uniform external pressure. When the segments of the dome properly abut, and the elemental valve is subjected to a uniform external pressure, the valve will be compressed into a tight pressure resistant structure.

Naturally, the details of design will change with the size of the valve and the operating conditions. Referring to Fig. 4, it will be desirable under severe operating conditions to impart to the surface of each segment a transverse arching, convexity or camber to form a scallop, as indicated at 19 and 19a, so that when external pressure in a direction opposite to that of the arrow A is applied to the valve, the convex regions 19 will be depressed, tending to widen the segments and cause their edges to press against the opposing complemental edges of the adjacent segments. This results in a tighter seal and leaves sufficient residual arch or camber to assist the segmental elements in resisting the opposing pressure. Therefore, the elemental valve with scalloped surface is a practical subcombination.

As all the individual segments may not return to their approximately normal hemispherical positions at exactly the same instant upon the stoppage of the fluid flow, the contact edges 20 thereof may each be tapered by being cut on an angle to the true radius, as indicated at 21, so as to enable a segment that might be slow in returning to its normal position to re-enter the space between neighboring segments and thereby key the closure into a dome structurally able to resist the applied downward pressure.

My improved "orange peel" valve may be made from any elastic abrasion-resistant material, generically known as elastomers, but the preferred material is natural or synthetic rubber, compounded and treated for the anticipated operating conditions. The structure of the valve is such that same may be molded in one operation. The end result is the provision of an abrasion resistant automatic closure so formed as to provide relatively unobstructed straight line flow, the valve being capable of arresting fluid flow even when the fluid handled contains suspended solids of considerable size. In the event the valve should be completely buried by solids, which settle out of the liquid, the resilient contacting edges 20 of the segments can give under applied pressure sufficiently, particularly when the settled solids have bridged slightly, to permit a trickle or light flow to start. Normally such a flow will be sufficient to refloat the settlings, thereafter resulting in sufficient flow to free the valve completely.

The segmented hemispherical closure of the elemental valve will not develop its maximum resistance to a uniform external pressure, unless adjacent segments abut each other evenly. The closure will largely loose its structure should a segment overlap an adjacent segment. To insure perfect alignment of the segments, and hence the maximum resistance to external pressure, an alignment body or spider may be placed axially inside the elemental valve, as shown in Figs. 5 to 10A inclusive, when it is to be used under the most severe conditions. Three types of alignment means are shown, one type, shown in Figs. 5 to 10 inclusive complementing the internal surface of the valve and having rectangular contact with the internal edges of adjacent segments, where they abut, and a second type, shown in Figs. 5A to 10A inclusive, complementing the internal surface of the valve and having angular contact with the internal edges of adjacent segments, where they abut. Inasmuch as some elastomers swell in the presence of some fluids, such as hydrocarbons, it will often be advisable to leave a gap, as shown at 18a, Figs. 7 and 7A, to compensate for any swelling that may occur with use, which will be closed by the pressure acting against the camber shown in Fig. 4, bringing adjacent segments into abutting contact.

In either case, the alignment spider consists of a plurality of radial partitions, centrally joined for part of the axial length of the spider, at least, there being as many partitions as there are segments in the hemispherical closure. The center line of each partition is aligned with the center line between adjacent segments. The spider is formed from an abrasion-resisting material, such as that used in the elemental valve body, although the composition of the spider may be more rigid or less elastic than that of the valve body. The spider may be made of metal, with some sacrifice of its abrasion resisting qualities, but such a spider will cause objectionable shear of the elemental valve body, when external pressure is applied. An elastic spider will contract, as external pressure is applied to the valve body, and expand, when the pressure is removed, and not distort the external pressure resisting shapes of the valve body. The spaces 25, Figs. 6 and 6A, between adjacent radial partitions or webs of the spider provide straight line flow passages for the fluid. Obviously considerable latitude is justifiable in the design of the alignment spider.

The spider is keyed to operating position with respect to the valve body in any convenient way, two methods being illustrated in Figs. 9 and 9A. When the partitions 24 make rectangular contact with the inner surface of adjacent segments, the outer edges of the partitions will be tangent to the inner surface of the valve body. The lower portion of the partitions is constructed with integral lugs 50, extending radially beyond the normal outside diameter of the spider, and mating with slots molded radially in the interior surface of the ring-like base, as shown at 51, Fig. 6. There is, therefore, no danger of the spider revolving about the common axis relative to the valve body.

When the outer edges complement and make angular contact with adjacent segments of the hemispherical closure, the inner portions of the abutting surfaces are tapered to match. This results in a V-shaped grove, when adjacent segments are pressed together, by an external pressure, and these grooves extend longitudinally along the inside surface of the ring-like base, to make it possible to slide the spider inside the valve body. This construction effectively keys this type of spider against rotation about the common axis, relative to the elemental valve. The outer edges of the lower portions of the partitions 24 are joined by an annular web 26 (Figs. 6A, 9A and 10A) which projects beyond the normal outside diameter of the spider and mates with a circumferential groove molded in the lower portion of the internal surface of the ring-like base, as shown in Fig. 5A. The lugs of Fig. 9 may be substituted for the annular web of Fig. 9A.

In general, the inner surface of the ring-like base is recessed to mate with a diametrical extension of the lower portion of the alignment spider and the lower portion of the spider is diametrically extended and shaped to mate with recess or recesses of the base. The spider is inserted in the elemental valve body through the hole in the ring-like base, and, it will be noted that the complementary void or voids in the inner surface of the ring-like base are designed to receive the diametrical extensions on the partitions of the spider inserted from the open end. It will be practical to cement the extensions on the spider partitions to the base of the elemental valve to hold the spider operably positioned with respect to the segments of the valve. Ordinarily, friction contact will be sufficient. As an extra precaution the projections on the spider bear against a shoulder in the ring-like base, as shown in Figs. 5 and 5A to prevent longitudinal movement upward, when fluid is flowing through the valve. The spider is further restrained against longitudinal movement downward, when pressure is applied to the external surface of the closed valve, by the extensions of the spider being held in operating position by a portion of the mounting, as shown in Figs. 11A to 16A, inclusive. When the valve is mounted in a socket, the lugs or web are restrained against downward movement by the apertured bottom or cover plate of the socket, as in Figs. 12A and 13A. When the elemental valve is mounted on a nipple, the lugs or web bear against the end of the nipple, as in Figs. 14A and 15A.

A third alignment means or body is shown sectionally in Fig. 9B and is a structure similar to the valve body proper. It is best described as a body formed with ring-like bass 15 having integrally joined therewith a plurality of resiliently flexible, relatively separable arcuate segments 18a, the arcuate segments being so formed and relatively positioned as to provide an external pressure resistant and dome-shaped closure for one end of the base. In general, this alignment body conforms with and complements the internal shape of the main valve and is positioned inside the valve by being inserted through the hole in the ring-like base thereof. The alignment means is rotated with respect to the valve, about the common longitudinal axis, so that the center lines of the arcuate segments 18a are approximately in register with the abutting edges of the arcuate segments 18 of the valve, when the arcuate segments of the alignment means overlap approximately equally the adjacent arcuate segments of the valve.

The alignment means is keyed to its operating position with respect to the elemental valve in any convenient way, as suggested in Figs. 10B to 10D inclusive.

It will be practical to cement the cylindrical ring-like base of the alignment means to the internal cylindrical surface of the base of the valve. As is shown in Fig. 10B, it is practical to extend the lower portion of the ring-like base of the alignment means radially to provide a shouldered ring 26, extending circumferentially around the alignment means base, to mate with a shouldered recess molded circumferentially in the internal surface of the base of the elemental valve. As shown in Fig. 10C, the base of the alignment means may be provided with at least one radial shouldered lug, 50, to mate with a corresponding slot molded in the internal surface of the base of the elemental valve. Ordinarily, at least three such lugs will be desirable. Or the lug or lugs may be molded in the internal surface of the shouldered recess of the valve base, to mate with a key-seat 50a molded in the shouldered ring 26, extending circumferentially around the alignment means base, as shown in Fig. 10D. When required, these constructions may be held in rotational and longitudinal alignment as already described in connection with the constructions of Figs. 9 and 9A.

Considerable latitude is possible in the design of the cross section (y—y, Fig. 9B) of the arcuate segments of the alignment body to meet various service conditions. The simplest design, resulting in the cheapest molds will be to make the external surface of the arcuate segments of the alignment means spherical to mate with the internal surfaces of the arcuate segments of the elemental valve, molded spherically. The cheapest construction will be to terminate the segments of the alignment means in a point, but squaring them off, as indicated at 66, Fig. 9B, to mate with a shouldered lug molded on the internal surfaces of the tips of the segments of the valve, will make the alignment of the adjacent elements more positive. In Fig. 10E, the external surfaces of the segments of the alignment body are molded to mate with the internal surfaces of the valve segments, when exaggerated transverse arching, forming a scallop, is used for the most severe operating conditions. Or recesses may be molded in the internal surfaces of the valve segments 18, with which the alignment segments 18a mate, as shown in Fig. 10F. Finally, this alignment means may be molded in a partially open position and/or cured to a relatively greater hardness to make the alignment of the valve segments still more positive. Inasmuch as some elastomers swell in the presence of some fluids, such as hydrocarbons, it will often be advisable to provide clearance, as shown at 18a, Figs. 7 and 7A, to compensate for any swelling that may occur with use.

The alignment means of Fig. 9B has an advantage of an unobstructed flow passage A in contrast to the constructions of Figs. 9 and 9A. Also, a valve so equipped may be opened mechanically, when necessary, by the insertion of a pipe through the hole in the ring-like base. It will be noted that all of these alignment bodies are radially elastically contractable, and even when made from an elastomer are structurally constrained to bring adjacent segments of the valve into alignment for abutting contact. The elemental valve, with an alignment means, is a practical subcombination.

The elemental valve will be modified in various ways to provide means for mounting it in a housing, as indicated in Figs. 12 to 16A inclusive. While Figs. 12A to 16A illustrate the alignment spider of Figs. 5 to 10A particularly, the valve and alignment body of Fig. 9B may be substituted without materially modifying the method of mounting in a housing. The outside surface of the ring-like base of the elemental valve of Fig. 1 will be modified in a variety of ways to provide means for mounting this type of valve in a socket or cylindrical aperture with a cover plate forming a shoulder with the aperture. In one design, the sealing lip is placed at the lower edge of the base, 17 of Fig. 2A, and designed to engage the shoulder of a circumferential recess in the wall of the socket, as illustrated in Figs. 13 and 13A. This may be modified by molding external threads integral with the outside surface of the base, above a modified sealing lip 17 to engage internal threads in the wall of the socket above the circumferential recess as illustrated in Figs. 12 and 12A. In both of these mountings, anchoring the valve is assisted by the natural suction of a resilient body packed into a recess by an incompressible fluid under pressure, and this is relied on solely in the designs of Figs. 16 and 16A. By providing the socket with a long enough shouldered recess to receive the body of the elemental valve, the mounting of Figs. 16 and 16A may be converted to the mounting of Figs. 13 and 13A. In these mountings, the element of the housing containing the socket may be joined to the element containing the apertured cover plate in any convenient way, as with threads or with flanges and bolts.

To mount the elemental valve on a nipple, the outer portion of the ring-like base is extended to form a skirt, as illustrated in Figs. 11 and 11A. The skirt forms a "counterbore" or an internal annular recess with the base, 56, Figs. 14 to 15A, with a large enough inside diameter to slip over the outside diameter of the nipple 53. When extreme pressure is to be coped with, the outer end of the skirt is tapered, as at 17, forming another type of fluid pressure engaged sealing lip with the outside wall of the nipple. The fluid pressure actuated sealing lip, illustrated at 17, Fig. 11, and 57, Figs. 14 and 15, permits the valve to contract and expand radially and longitudinally without imposing objectionable distortional stresses.

As most elastomers are incompressible (that is, their volume remains constant, when subjected to external or compressive pressures), the walls of the ring-like base and the hollow segmented hemispherical closure will thicken, when the elemental valve is subjected to external pressure. This reduces the inside diameters proportionately. The objectionable shear that will be caused at the base of the skirt by the end of the nipple, in this type of mounting, will be eliminated by providing ample clearance between the inside diameter of the skirt and the outside diameter of the nipple, as shown at 58. The contact of the shoulder 58 with the end of the nipple aligns the parts, and necking in the sealing lip 57 centers them. Tapering the end of the nipple permits the constricted sealing lip to be slid over the nipple easily.

The valve body is held in position, as the flow through the valve reverses by suction grooves 54 molded in the internal surface of the skirt, as in Fig. 14 and 14A, or the external surface of the nipple is threaded to mate with a thread molded in the internal surface of the skirt, as in Figs. 15 and 15A, 60.

A shoulder and enlarged diameter 59 is provided at the base of the nipple to engage the sealing lip, Figs. 15 and 15A. The alignment spider 26 is held against upward movement with respect to the valve body, by means of the shoulder molded in the body engaging the lugs or web of the spider partitions, as has been described. The spider is held against downward movement with respect to the valve body by the lugs or web of the spider partitions bearing against the end of the nipple.

From the foregoing, it is evident that this invention improves the old simple "orange peel" valve adapting it to cope with the highest pressures the material from which it is made will withstand and insuring dependable operation. The configuration of the cooperating parts insure the maintenance of an external pressure resisting structure when the valve is compressed. The use of an internal alignment spider insures proper contact of the cooperating parts to maintain a structure offering the maximum resistance to external pressure. A variety of ways have been disclosed for mounting the elemental valve in any housing suitable for any prescribed service, so that metal will not subject the elemental valve to unyielding and objectionable shear stresses. Finally, it will be possible to arrange any number of the individual valves such as those illustrated in Figs. 12 to 13A inclusive, in series, making the valve suitable for higher pressures, when the fluid handled is incompressible, because the elasticity of the valve will distribute the total pressure uniformly over the separate units.

I claim:

1. A check valve structure comprising a housing and a body formed with a ring-like base, means for mounting said base in the housing, the base having integrally joined therewith, a plurality of resiliently flexible, relatively separable arcuate segments, said arcuate segments being so formed and relatively positioned as to provide an external pressure resistant and dome-shaped closure for one end of said base, each of said segments being longitudinally and transversely arched, the transverse arching of each segment being exaggerated so that, when the segments are mated, a transverse section of the segments is scalloped rather than circular, each segment forming one scallop; a sealing lip formed integrally with the base shaped for fluid pressure enforced contact with the housing operable to prevent leakage between the valve and housing, when the valve is closed and a radially elastically contractable alignment body positioned within said valve, conforming with the normal internal curvature of said valve, with a fluid passage therethrough, contacting the inner surfaces of adjacent segments and structurally constrained to bring them into alignment for abutting contact, when the segments are compressed by an externally applied pressure, said alignment body being held in operable position with respect to said segments.

2. A check valve comprising a body formed with a ring-like base, means for mounting said base in a housing, the base having integrally joined therewith a plurality of resiliently flexible, relatively separable arcuate segments, said arcuate segments being so formed and relatively positioned as to provide an external pressure resistant and dome-shaped closure for one end of said base, each of said segments being longitudinally and transversely arched, the transverse arching of each segment being exaggerated so that, when the segments are mated, a transverse section of the segments is scalloped rather than circular, each segment forming one scallop, so that, when said dome-shaped structure is compressed by an inwardly directed external pressure, each of said segments will still be transversely arched and structurally resistant to said external pressure.

3. A check valve structure comprising a housing and a body formed with a ring-like base, means for mounting said base in the housing, the base having integrally joined therewith a plurality of resiliently flexible, relatively separable arcuate segments, said arcuate segments being so formed and relatively positioned as to provide an external pressure resistant and dome-shaped closure for one end of said base, each of said segments being longitudinally and transversely arched, the transverse arching of each segment being exaggerated, so that, when the segments are mated, a transverse section of the segments is scalloped rather than circular, each segment forming one scallop; a sealing lip formed integrally with the base shaped for fluid pressure enforced contact with the housing, operable to prevent leakage between the valve and housing, when the valve is closed and a radially elastically contractable alignment body, comprising a structure similar to the valve, including a ring-like base, the base having integrally joined therewith a plurality of resiliently flexible, relatively separable arcuate segments, said arcuate segments being so formed and relatively positioned as to coact with the segments of the valve to provide an external pressure resistant and dome-shaped closure for one end of said base, the alignment body being positioned within said valve by rotating around a common axis until the centers of the alignment segments approximately coincide with the lines of contact of adjacent segments of the valve, the external surface of the alignment body conforming with and complementing the internal surface of said valve, said body being structurally constrained to bring adjacent segments of the valve into abutting contact, when the segments are compressed by an externally applied pressure, said alignment body being held in operable position with respect to said segments.

4. A check valve comprising a body formed with a ring-like base, means for mounting said base in a housing, the base having integrally joined therewith a plurality of resiliently flexible, relatively separable arcuate segments, said arcuate segments being so formed and relatively positioned as to provide an external pressure resistant and dome-shaped closure for one end of said base and a radially elastically contractable alignment body, comprising a structure similar to the valve, including a ring-like base, the base having integrally joined therewith a plurality of resiliently flexible, relatively separable arcuate segments, said arcuate segments being so formed and relatively positioned as to coact with the segments of the valve to provide an external pressure resistant and dome-shaped closure for one end of said base, the alignment body being positioned within said valve, by rotating around a common axis until the centers of the alignment segments approximately coincide with the lines of contact of adjacent segments of the valve, the external surface of the alignment body conforming with and complementing the internal surface of said valve, said body being structurally constrained to bring adjacent segments of the valve into abutting contact, when the segments are compressed by an externally applied pressure, said alignment body being held in operable position with respect to said segments.

5. A check valve structure comprising a housing and a body formed with a ring-like base, means for mounting said base in the housing, the base having integrally joined therewith a plurality of resiliently flexible, relatively separable arcuate segments, said arcuate sgments being so formed and relatively positioned as to provide an external pressure resistant and dome-shaped closure for one end of said base, each of said segments being longitudinally and transversely arched, the transverse arching of each segment being exaggerated, so that, when the segments are mated, a transverse section of the segments is scalloped rather than circular, each segment forming one scallop; a sealing lip formed integrally with the base shaped for fluid pressure enforced contact with the housing, operable to prevent leakage between the valve and housing, when the valve is closed and a radially elastically contractable alignment body, positioned within said valve comprising radially disposed partitions, joined along a center axis, with fluid passages between, the outer edges of said partitions conforming with the normal internal curvature of said valve, and the edges of said partitions adjacent said arcuate segments being shaped to complement adjacent edges of said segments and shaped for abutting contact with them, the partitions being structurally constrained to bring adjacent segments of the valve into alignment for abutting contact, when the segments are compressed by an externally applied pressure, said alignment body being held in operable position with respect to said segments.

6. A check valve comprising a body formed with a ring-like base, means for mounting said base in a housing, the base having integrally joined therewith a plurality of resiliently flexible, relatively separable arcuate segments, said arcuate segments being so formed and relatively positioned as to provide an external pressure resistant and dome-shaped closure for one end of said base and a radially elastically contractable alignment body, positioned within said valve comprising radially disposed partitions, joined along a center axis, with fluid passages between, the outer edges of said partitions conforming with the normal internal curvature of said valve, and the edges of said partitions adjacent said arcuate segments being shaped to complement adjacent edges of said segments and shaped for abutting contact with them, the partitions being structurally constrained to bring adjacent segments of the valve into alignment for abutting contact, when the segments are compressed by an externally applied pressure, said alignment body being held in operable position with respect to said segments.

References Cited in the file of this patent

UNITED STATES PATENTS

| Number | Name | Date |
|---|---|---|
| 584,091 | Leidich | June 8, 1897 |
| 2,092,757 | Groeniger | Sept. 14, 1937 |
| 2,347,988 | Burke | May 2, 1944 |
| 2,352,642 | Langdon | July 4, 1944 |
| 2,354,255 | Gillum | July 25, 1944 |
| 2,378,384 | Baker | June 19, 1945 |
| 2,520,092 | Fredrickson | Aug. 22, 1950 |
| 2,524,764 | Burke | Oct. 10, 1950 |
| 2,576,192 | Ponzik | Nov. 27, 1951 |

FOREIGN PATENTS

| Number | Country | Date |
|---|---|---|
| 336,530 | Germany | 1921 |